June 19, 1934.  W. B. BRONANDER  1,963,644
CELLOPHANE WINDER AND CUTTER
Filed July 8, 1933    2 Sheets-Sheet 2
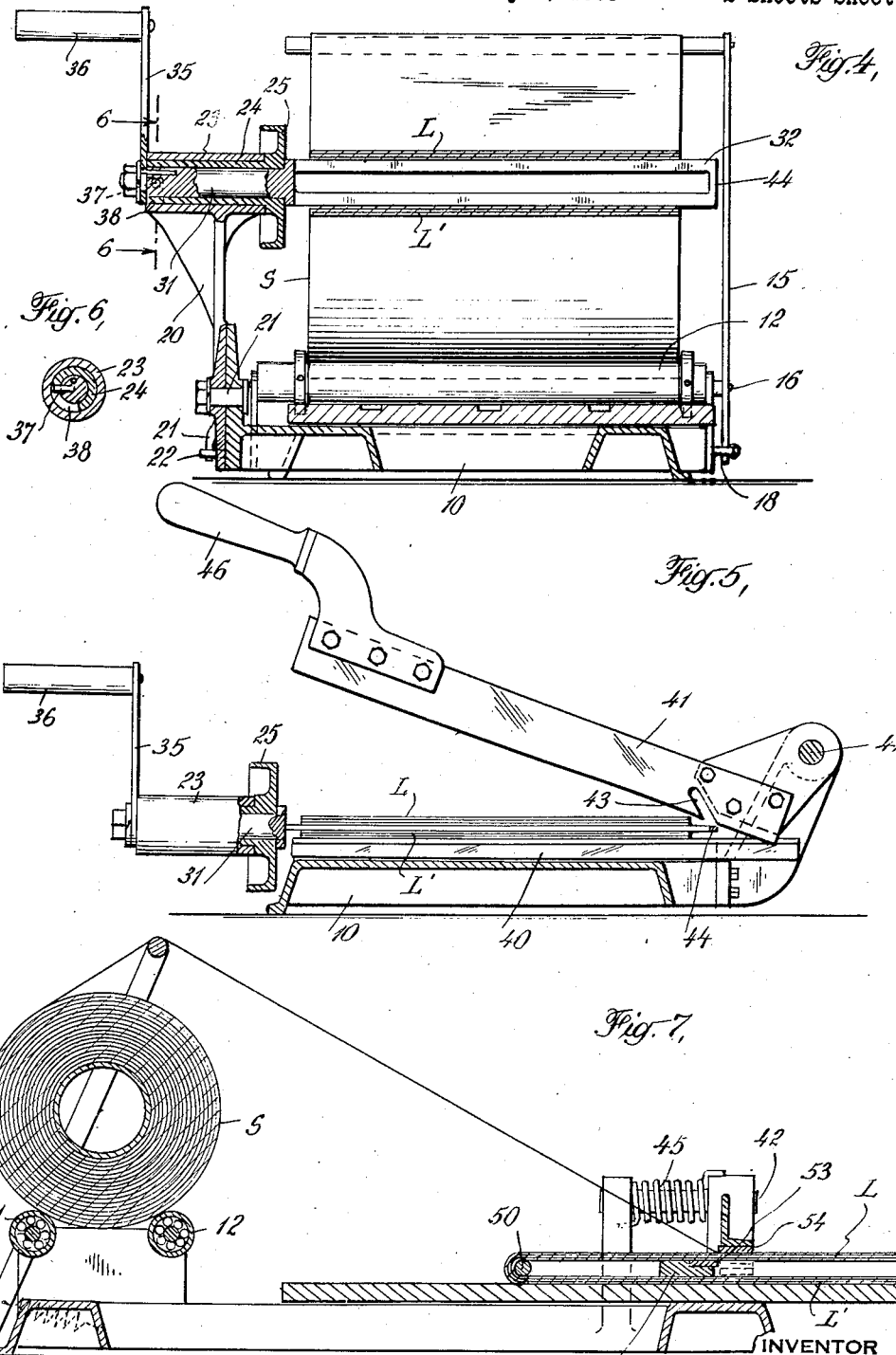
INVENTOR
Wilhelm B. Bronander
BY
Marshall & Hawley.
ATTORNEYS Patented June 19, 1934

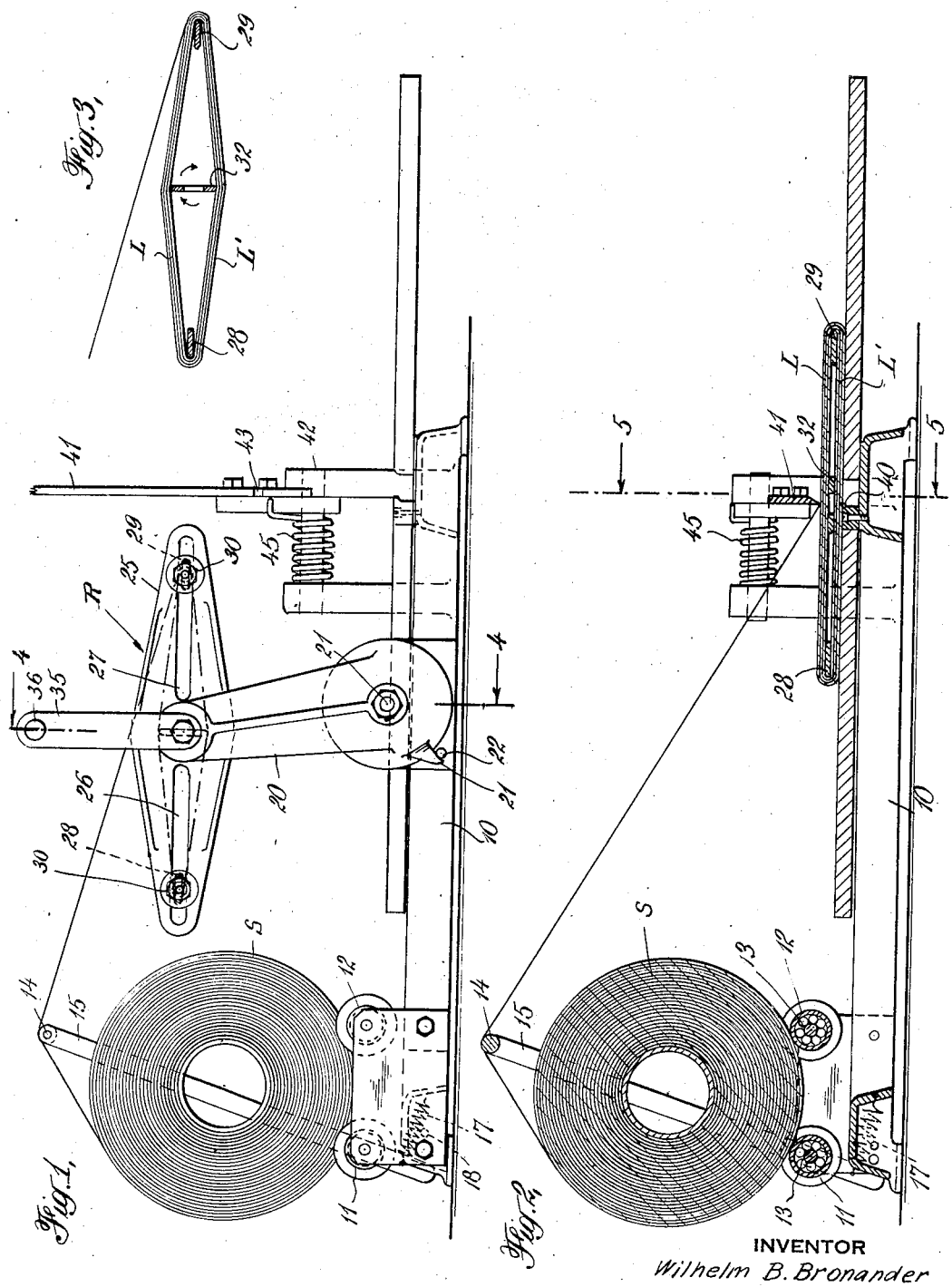

1,963,644

UNITED STATES PATENT OFFICE

1,963,644

CELLOPHANE WINDER AND CUTTER

Wilhelm B. Bronander, Montclair, N. J.

Application July 8, 1933, Serial No. 679,491

21 Claims. (Cl. 164—42)

This invention relates to a machine for winding and cutting lengths of sheet material, such as webs of cellophane.

Material, such as cellophane, is difficult to handle and to cut because of its tendency under tension to split or tear in advance of the cutting knives.

This invention has for one of its objects to provide cutting mechanism so constructed and arranged that a plurality of sheets can be cut simultaneously.

Another object of the invention is to provide winding and cutting mechanism having means for relieving tension on the material during the cutting operation.

Another object of the invention is to provide mechanism of the character described so constructed and arranged that the lengths of the web which are cut will be substantially uniform and will have even, clean ends.

Further objects of the invention will appear from the following specification taken in connection with the drawings which form a part of this application, and in which Fig. 1 is an elevational view of a machine constructed in accordance with the invention;

Fig. 2 is a longitudinal sectional elevation of the machine shown in Fig. 1 the reel being shown in lowered position between the cutting knives;

Fig. 3 is a detail sectional elevation through the winding reel and showing the web spacing means in position to spread the webs apart;

Fig. 4 is a detail sectional elevation taken substantially on line 4—4 of Fig. 1;

Fig. 5 is a sectional elevation of the cutting knives taken substantially on line 5—5 of Fig. 2;

Fig. 6 is a transverse sectional elevation of the reel mounting and shaft taken substantially on line 6—6 of Fig. 4; and Fig. 7 is a sectional elevation similar to Fig. 2, but illustrating a slightly modified form of cutting mechanism whereby the upper lap of the material around the reel is cut instead of both laps as in the form of the invention shown in Figs. 1 to 5 inclusive.

The invention briefly described consists of a device having means for supporting a roll of sheet material, such as a web of cellophane, a substantially flat reel having a pair of arms disposed on opposite sides of the reel axis, the reel being mounted on a pivoted bracket whereby it may be swung from winding position to a position above a stationary cutting knife, in which latter position the complementary cutting knife may be swung down to cut the material on the reel. Means is also provided on the reel for spacing or spreading the laps of the material wound thereon during the winding operation, this means being mounted in such a way that during the cutting operation the spreading means is inoperative and the tension on the web is relieved. The provision of such means overcomes a tendency of the cellophane web, when stretched, to tear or split in advance of the cutting mechanism.

Further details of the invention will appear from the following description.

In the embodiment of the invention illustrated in Figs. 1 to 5 the device comprises a base 10 having rotatably mounted thereon at one end a pair of rolls 11 and 12 which are preferably provided with roller bearings 13. The rollers 11 and 12 support a supply roll S of sheet material, such as a web of cellophane. In order to tension the material as it is being wound on the reel the material is carried over a rod 14 which is carried by an arm 15 mounted on a pivot 16 and urged in an anticlockwise direction by means of a spring 17. The movement of the arm under the action of the spring is limited by a stop pin 18.

The web which is unwound from the roll S is wound on a winding reel R which is rotatably mounted on a bracket 20 pivoted on a pin 21 carried by the frame 10. The movement of the bracket in an anticlockwise direction is limited by the engagement of a lug 21 formed on the bracket with a pin 22 carried by the frame.

The upper end of the bracket 20 is provided with a bearing sleeve 23 in which is rotatably mounted a sleeve 24 having a frame 25 secured to one end thereof. The frame 25 is provided with slots 26 and 27 which extend longitudinally of the frame and radially of the axis of the bearing 23. Arms 28 and 29 are adjustably mounted on the frame 25 in the slots 26 and 27, the arms being secured in adjusted position by means of nuts 30.

A spindle 31 is rotatably mounted in the sleeve 24 and has secured to one end thereof a flat rectangular closed frame 32 substantially equal in length to the length of the arms 28 and 29. The spindle 31 has secured to its outer end a crank comprising an arm 35 and a handle 36. A pin 37 is also secured to the spindle 31, as shown in Fig. 6, and extends into an arcuate notch 38 formed in the sleeve 24, the notch extending approximately through 90°.

The object of the frame 32 is to space the laps L and L' of the web as they are wound on the arms 28 and 29 of the winding reel R. During the winding operation the frame is disposed at right angles to the plane of the arms, as shown in Fig. 3. However, during the cutting operation the frame is rotated through 90° to a position disposed in the plane of the arms, as shown in Fig. 5. When the crank is rotated in a clockwise direction to wind the material on the reel the initial movement of the crank will turn the frame 32 to the position shown in Fig. 3. Further rotation of the crank will then cause the sleeve 24 and reel to rotate with the crank, thus winding the material on the reel.

The cutting mechanism shown in Figs. 1 to 5 inclusive comprises a stationary knife 40 carried by the frame 10 and a pivoted knife 41 which is mounted on a pivot 42 and is provided with a notch 43 for receiving the closed outer end 44 of the web spacing frame 32 when the knife 41 is swung downwardly into cutting position. A spring 45 holds the pivoted knife 41 in retracted position and the knife is provided with a handle 46 for swinging the blade downwardly to operative position.

The device above described operates in the following manner: The material from the supply roll S is secured in any suitable manner to the winding reel and the crank of the reel is then rotated, first moving the spacing frame 32 to the position shown in Fig. 3 at right angles to the plane of the arms 28 and 29 and then rotating the reel in a clockwise direction to wind thereon as many lengths of material as are desired. The handle is then turned in an anticlockwise direction to rotate the frame 32 through 90° to a position disposed in the plane of the arms 28 and 29. This will obviously relieve the tension on the web. The pivoted bracket 20 is then swung downwardly to dispose the reel in position above the stationary knife 40. The pivoted knife 41 is then swung downwardly and will cut through the upper and lower laps L and L' of the web viewing Fig. 2, thus providing two sets of lengths of material, namely, one at the left of the cutting mechanism and the other at the right thereof. By adjusting the arms 28 and 29 different distances from the reel axis the length of material in the two sets will be different.

The device shown in Fig. 7 is similar to that illustrated in the preceding figures except that in this form of the invention the reel is provided intermediate the arms 50 and 51 with a bar 52 pivoted in a manner similar to frame 32 but having a stationary cutting knife 53 mounted thereon. The pivoted cutting knife 54 coacts with the knife 53 in cutting the upper lap L of the material wound on the reel. The knives in this form of the invention are horizontal instead of vertical and it will be noted that the lengths cut extend entirely around the reel instead of half way around as the lengths cut by the mechanism illustrated in the preceding figures.

Although certain specific embodiments of the invention have been particularly shown and described, it will be understood that the invention is capable of modification and that changes in the construction and in the arrangement of the various cooperating parts may be made without departing from the spirit or scope of the invention as expressed in the following claims.

What I claim is:

1. In combination, a rotatable winding reel, a stationary cutting knife, a movable cutting knife, the reel being mounted for movement between the knives and in juxtaposition to the stationary knife.

2. In combination, a rotatable winding reel, comprising a pair of spaced arms disposed on diametrically opposite sides of the axis of rotation, a stationary cutting knife, a movable cutting knife, the reel being mounted for movement between the knives and in juxtaposition to the stationary knife.

3. In combination, a rotatable winding reel comprising a pair of arms and web spacing means between said arms, a stationary cutting knife, a movable cutting knife, the reel being mounted for movement between the knives and in juxtaposition to the stationary knife.

4. In combination, a rotatable winding reel comprising a pair of spaced arms disposed in the same plane and web spacing means between said arms, said spacing means being movable from a position at right angles to the plane of said arms to a position in said plane, a stationary cutting knife, a movable cutting knife, the reel being mounted for movement between the knives and in juxtaposition to the stationary knife.

5. In combination, a support, a pivoted bracket mounted thereon, a flat reel rotatably mounted on the bracket, and cutting mechanism comprising a fixed and a movable member, said bracket being so located and so dimensioned relative to the cutting mechanism as to dispose the reel between said cutting members in one position of the bracket.

6. In combination, a support for a roll of sheet material, a rotatable reel for unwinding the material from the roll and on to the reel, said reel comprising a pair of arms spaced on opposite sides of the reel axis, and means on the reel intermediate the arms, movable relative to the arms for holding the laps of material on the reel away from each other during the winding of the web thereon.

7. In combination, a support for a roll of sheet material, a pivoted bracket on the support, a rotatable reel on said bracket for unwinding the material from the roll and on to the reel, said reel comprising a pair of arms spaced on opposite sides of the reel axis, and means on the reel intermediate the arms for holding the laps of material on the reel away from each other during the winding of the web thereon.

8. In combination, a support, a bracket pivoted thereon, a substantially flat reel on said bracket, rotatable thereon, a crank handle connected to said reel, and a web spacer connected to said crank handle and movable relative to the reel from a position substantially at right angles to the plane of the reel to a position disposed in said plane.

9. A machine for winding and cutting a web of cellophane or like material comprising a substantially flat reel, means on the reel for spreading apart the webs on the two sides of the flat reel as they are wound thereon, a pair of cutter members, the reel being mounted for movement between the cutter members, and means for moving the spreader into the plane of the reel when the web is to be cut.

10. A machine for winding and cutting a web of cellophane or like material comprising a frame having a stationary cutting knife, a pivoted cutting knife arranged to coact therewith, and a substantially flat reel for winding the web of cellophane, said reel being movable from winding position above the frame to a flat position on the frame above the stationary knife in which latter position the pivoted blade may engage and cut the web.

11. In combination, a substantially flat rotary reel comprising a pair of arms spaced on opposite sides of the reel axis, a reel shaft, means intermediate said arms for spacing or spreading apart the two laps of material wound on the reel, and an operating crank connected to the spacing means arranged when moved in one direction to dispose said means in spacing position and when moved in the opposite direction to dispose said means in inoperative position.

12. In combination, a substantially flat rotary reel comprising a pair of arms spaced on opposite sides of the reel axis, a reel shaft, means intermediate said arms for spacing or spreading apart the two laps of material wound on the reel, an operating crank connected to the spacing means arranged when moved in one direction to dispose said means in spacing position and when moved in the opposite direction to dispose said means in inoperative position, and means between the crank and reel shaft for causing the crank to rotate the shaft after a predetermined movement of the crank in one direction.

13. In combination, a substantially flat rotary reel comprising a pair of arms spaced on opposite sides of the reel axis, a reel shaft, means intermediate said arms for spacing or spreading apart the two laps of material wound on the reel, an operating crank connected to the spacing means arranged when moved in one direction to dispose said means in spacing position and when moved in the opposite direction to dispose said means in inoperative position, and means between the crank and reel shaft for causing the crank to rotate the shaft after the crank has moved said spacing means to operative position.

14. In combination, a substantially flat rotary reel having a pair of arms spaced on opposite sides of the reel axis, a support for a roll of sheet material to be wound on the reel, a web tautener between the roll support and reel, means on the reel for spacing the laps wound on the reel apart, during winding, said means being movable to inoperative position when the winding is completed and the web is to be cut, and means for cutting the material wound on the reel.

15. In combination, a pivoted bracket, a substantially flat rotary reel mounted thereon and having a pair of arms spaced on opposite sides of the reel axis, a support for a roll of sheet material to be wound on the reel, a web tautener between the roll support and reel, means on the reel for spacing the laps wound on the reel apart, during winding, said means being movable to inoperative position when the winding is completed and the web is to be cut, and means for cutting the material wound on the reel, the bracket being movable to so position the reel and web thereon that the cutting means is operative to cut the material.

16. In combination, a rotatable winding reel, comprising a pair of spaced arms disposed on diametrically opposite sides of the axis of rotation and adjustable toward and away from said axis, a stationary cutting knife, a movable cutting knife, the reel being mounted for movement between the knives and in juxtaposition to the stationary knife.

17. In combination, a rotatable winding reel comprising a pair of arms adjustable toward and away from the reel axis and web spacing means between said arms, a stationary cutting knife, a movable cutting knife, the reel being mounted for movement between the knives and in juxtaposition to the stationary knife.

18. A machine for winding and cutting a web of cellophane or like material comprising a substantially flat reel, means on the reel for spreading apart the webs on the two sides of the flat reel as they are wound thereon, and a cutter arranged to coact with said spreading means to cut the web.

19. In combination, a substantially flat rotary reel comprising a pair of arms spaced on opposite sides of the reel axis, a reel shaft, means intermediate said arms for spacing or spreading apart the two laps of material wound on the reel, and a cutter arranged to coact with said spreading means to cut the web.

20. In combination, a rotatable winding reel comprising a pair of spaced arms disposed on opposite sides of the reel axis, means between the arms for spreading the laps of material wound thereon, a stationary knife and a movable knife arranged to coact therewith to cut the web, said reel being movable to a position between the knives, and said spreading means having an opening to receive the movable knife during the cutting operation.

21. In combination, a support for a roll of sheet material, a rotatable reel for unwinding the material from the roll and on to the reel, said reel comprising a pair of arms spaced on opposite sides of the reel axis, and means on the reel intermediate the arms and disposed substantially at the reel axis, for holding the laps of material on the reel away from each other during the winding of the web thereon.

WILHELM B. BRONANDER.